Feb. 14, 1967     L. B. SCOTT     3,303,880
METHOD OF AND APPARATUS FOR ASSISTING IN THE
INJECTION OF WELL TREATING FLUIDS
Filed Sept. 3, 1963     6 Sheets-Sheet 1
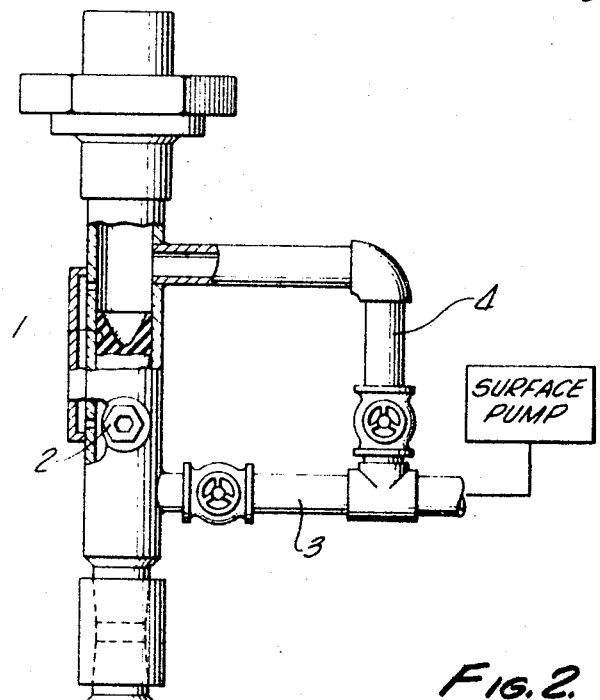
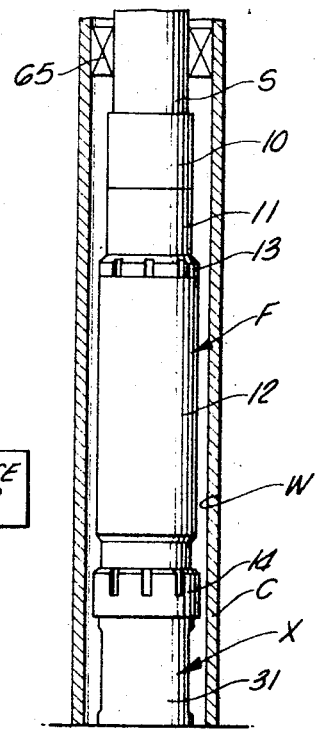
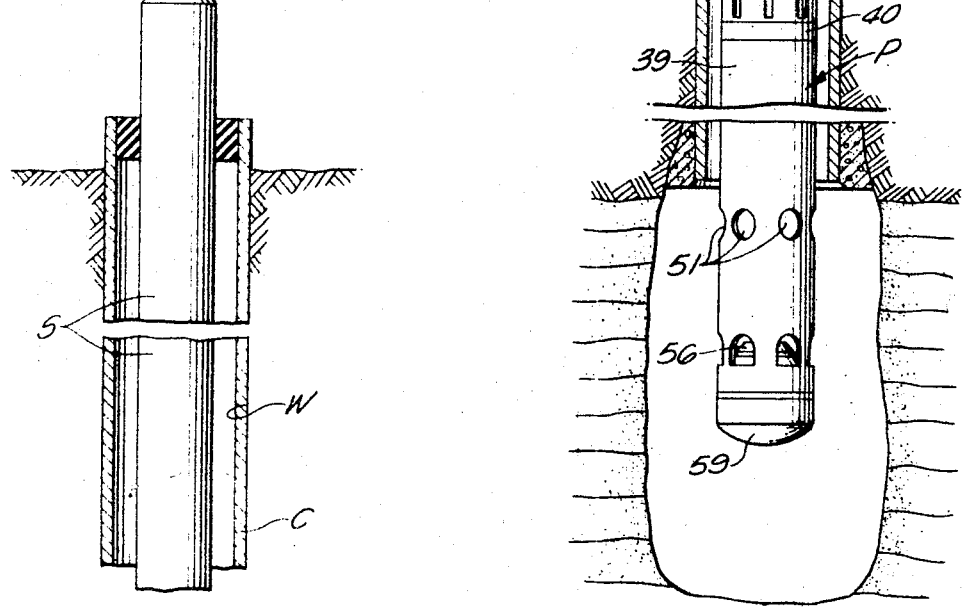
INVENTOR.
LYLE B. SCOTT
BY
ATTORNEY

INVENTOR.
LYLE B. SCOTT

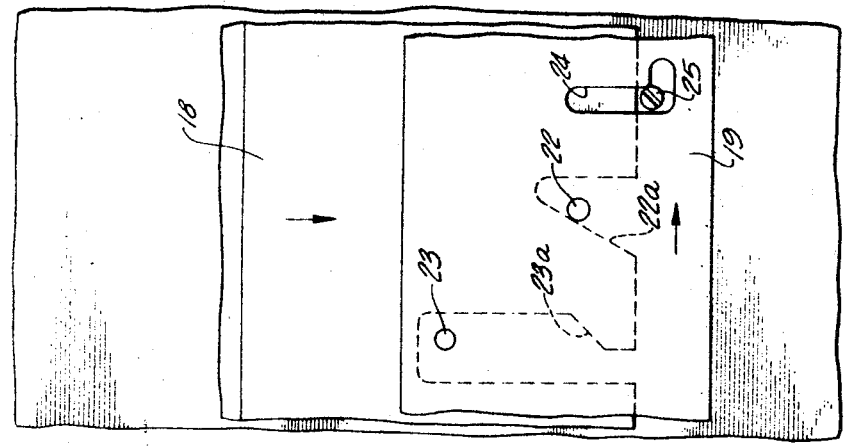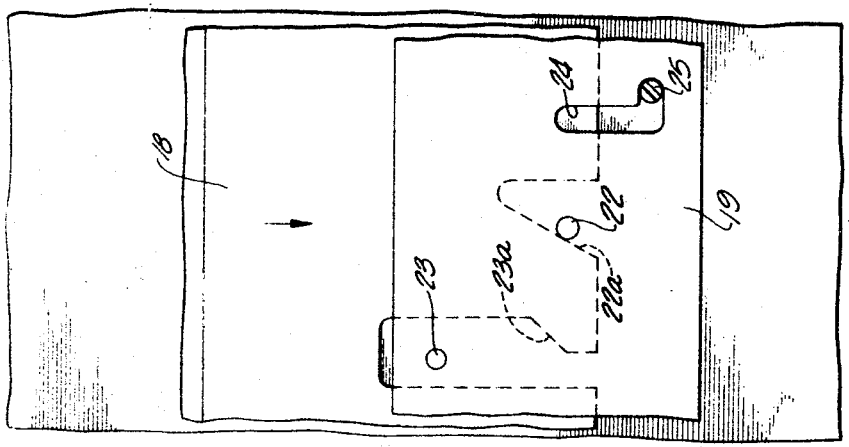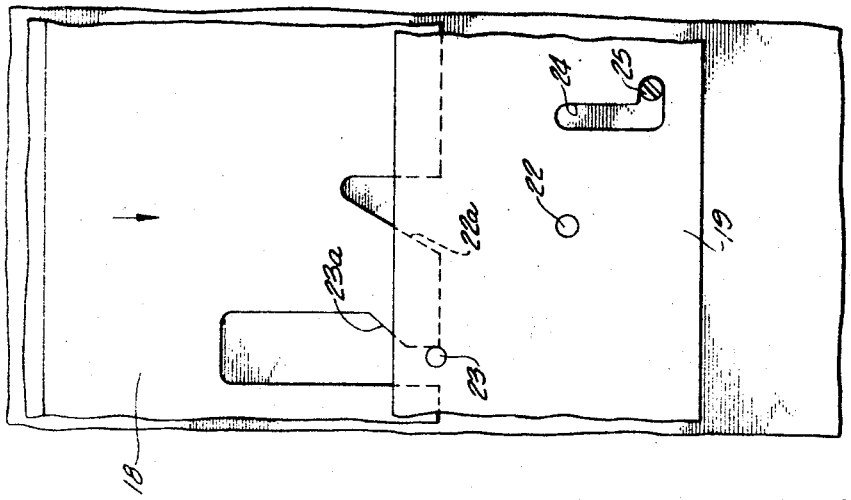

Feb. 14, 1967 L. B. SCOTT 3,303,880
METHOD OF AND APPARATUS FOR ASSISTING IN THE
INJECTION OF WELL TREATING FLUIDS
Filed Sept. 3, 1963 6 Sheets-Sheet 4
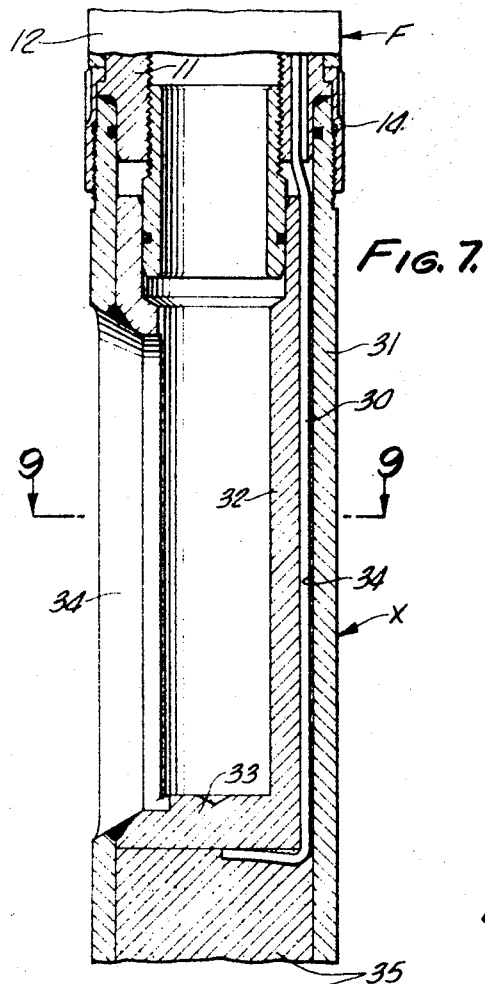
FIG. 7.
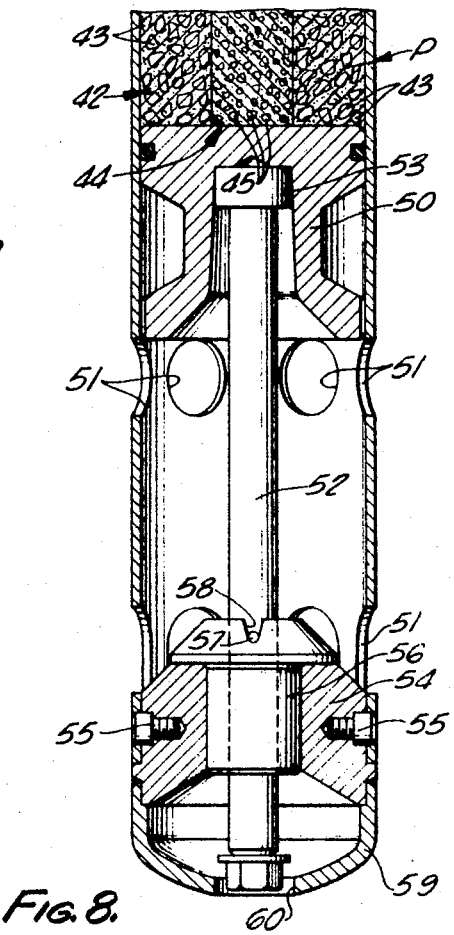
FIG. 8.
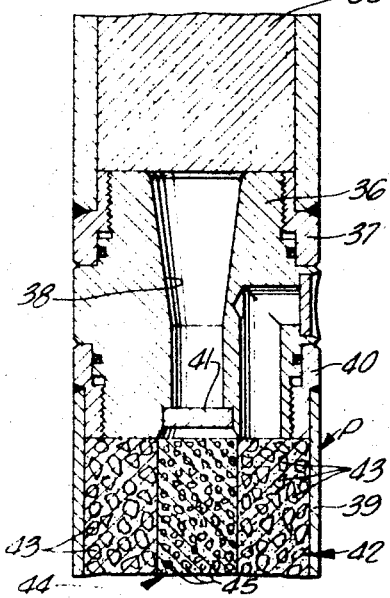
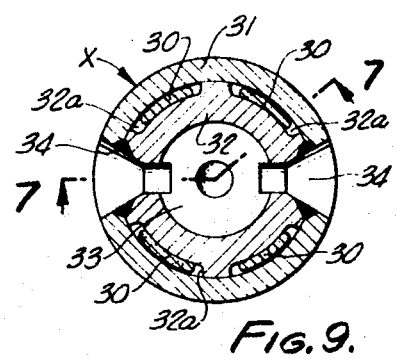
FIG. 9.
INVENTOR.
LYLE B. SCOTT
BY
Alan B. Hambly
ATTORNEY Feb. 14, 1967

L. B. SCOTT 3,303,880

METHOD OF AND APPARATUS FOR ASSISTING IN THE INJECTION OF WELL TREATING FLUIDS

Filed Sept. 3, 1963

INVENTOR.
LYLE B. SCOTT

BY

ATTORNEY

Feb. 14, 1967  L. B. SCOTT  3,303,880
METHOD OF AND APPARATUS FOR ASSISTING IN THE
INJECTION OF WELL TREATING FLUIDS
Filed Sept. 3, 1963  6 Sheets-Sheet 6

INVENTOR.
LYLE B. SCOTT
BY
*Allen B. Hambly*
ATTORNEY

United States Patent Office 3,303,880
Patented Feb. 14, 1967

3,303,880
METHOD OF AND APPARATUS FOR ASSISTING IN THE INJECTION OF WELL TREATING FLUIDS
Lyle B. Scott, South Gate, Calif., assignor to Byron Jackson, Inc., Long Beach, Calif., a corporation of Delaware
Filed Sept. 3, 1963, Ser. No. 306,161
17 Claims. (Cl. 166—36)

The present invention relates to a method and an apparatus for assisting in the injection of treating fluids into earth formations into which or through which a well bore has been drilled. In the completion of new oil and gas wells and in the stimulation of old oil and gas wells it is the practice to inject fluid under pressure into the earth formation so as to enhance the productivity of the oil or gas bearing formation as by opening fractures or fissures therein or as by removing certain calcareous material therefrom. Such practices are also useful in the treatment of water injection wells in water flood projects.

Generally, the present invention relates to means for assisting in the injection of well treating fluids into the formation to form such fractures or fissures and to remove such calcareous deposits, as well as to means for propping open such fissures or fractures.

In the pending application of Mathew B. Riordan, Jr., Serial No. 616,223, filed October 18, 1956, now Patent No. 3,101,115, there are disclosed a well treating method and apparatus whereby responsive to and during the pumping of formation fracturing or acidizing fluids into the well bore and hence into a potentially productive earth formation a large volume of gas is generated over a period of time affording a substantial boost to the effective formation treating pressure of the treating fluid and causing higher injection rates during the generation of such volume of gas.

It has long been a problem in the fracturing and acidizing of subsurface earth formations penetrated by a well bore to inject the treating fluid into the earth formation in sufficient volume, i.e., at such injection rates, as to produce such pressures as to effectively treat the formation. The problem exists, notwithstanding the availability of infinite pump capacity at the earth's surface, due to friction losses occurring within the pipe through which the fluid must flow downwardly into the well to reach the formation undergoing treatment and due to fluid loss into the formation.

The present invention contemplates an improvement in the method and apparatus disclosed in the aforementioned application of Mathew B. Riordan, Jr., in point of economy and in point of volume of gas generated.

Solid monopropellant materials comprising an oxidant, copolymeric rubber filler, and a burning catalyst, such as are employed as rocket fuels in rocket motors are quite costly. Moreover, such rocket propellant fuels must be burned in substantial volume in order to provide a volume of gas which is effective to significantly increase the pressure acting on well treating fluid in the fracturing or acidizing of subsurface earth formation traversed by a well bore in which the gas is liberated.

An object of the present invention is to provide a method of assisting the injection of treating fluid into an earth formation wherein scrap solid propellant fuel is reclaimed and employed as a source of gas.

Yet another object of the invention is to provide a subsurface tool for burning the propellant fuel, which tool has a propellant chamber of substantially larger volume than the container for solid propellant fuel as disclosed in the aforementioned application of Mathew B. Riordan, Jr.

In the hydraulic fracturing of earth formation, moreover, it is the practice to mix with the fracturing fluid, as is well known in the art, solid propping agents comprising sand, aluminum pellets, or the like which may be mixed with the fracturing fluid at the earth's surface and pumped into the well along with the fracturing fluid. Such propping agents are generally of small size, the larger particles ranging between 10 and 20 mesh in size. These propping agents are carried by the fracturing fluid into the fractures and fissures to prevent the same from closing when the forcing of fluid therethrough is ceased.

The present invention contemplates the provision of a method and means whereby propping elements are admitted to the well bore in the vicinity of the fractures, so that the propping elements may be of a size larger than can ordinarily be displaced into the well bore by surface pumping equipment, it being contemplated that propping elements having dimensions up to ½" to ¾", or larger, if desired, may be employed.

In the fracturing of earth formations traversed by a well bore as contemplated herein, it is generally understood that the development of hydraulic pressure within the well bore, whereby the compressive or tensile strength of the formation is overcome, causes the opening of a fracture or fractures which initially open wide as the formation stresses are released; but which subsequently tend to partially close and if not propped open such fractures will completely close when the pumping ceases. Accordingly, the present invention, in providing for the admission into the well bore adjacent the formation to be fractured of large particle propping agents, enables the propping open of the fracture as initially formed with such large particle propping agents.

In accordance with the foregoing, it is another object of the invention to provide, in combination with means for releasing a large volume of gas to supplement the hydraulic pressures applied to the formation, means for also liberating into the fluid being displaced into the formation a quantity of large size propping elements as referred to above. These propping elements may be in the form of manufactured balls; for example, as employed to temporarily seal casing perforations in accordance with United States Patent No. 2,754,910, or, if preferred, the propping elements may consist of any desired material having sufficient compressive strength to support the formation overburden so as to maintain the fracture open.

Other objects and advantages of the invention will be hereinafter described or will become apparent to those skilled in the art, and the novel features of the invention will be defined in the appended claims.

In the accompanying drawings:

FIG. 1 is a view partly in elevation and partly in section showing equipment useful at the earth's surface in accordance with the invention;

FIG. 2 is a fragmentary view in elevation showing the subsurface apparatus in accordance with the invention;

FIGS. 4, 5 and 6 are views schematically illustrating successive relative positions of the firing cam mechanism shown in FIG. 3;

FIG. 7 is a longitudinal sectional view through the intermediate portion of the subsurface apparatus of FIG. 2, and showing the cross-over or outlet assembly and propellant chamber;

FIG. 8 is a downward extension of FIG. 7 showing the discharge end of the propellant chamber;

FIG. 9 is a transverse sectional view as taken on the line 9—9 of FIG. 7;

Like reference characters in the several views of the drawings and the following description designate corresponding parts.

Figure 3:
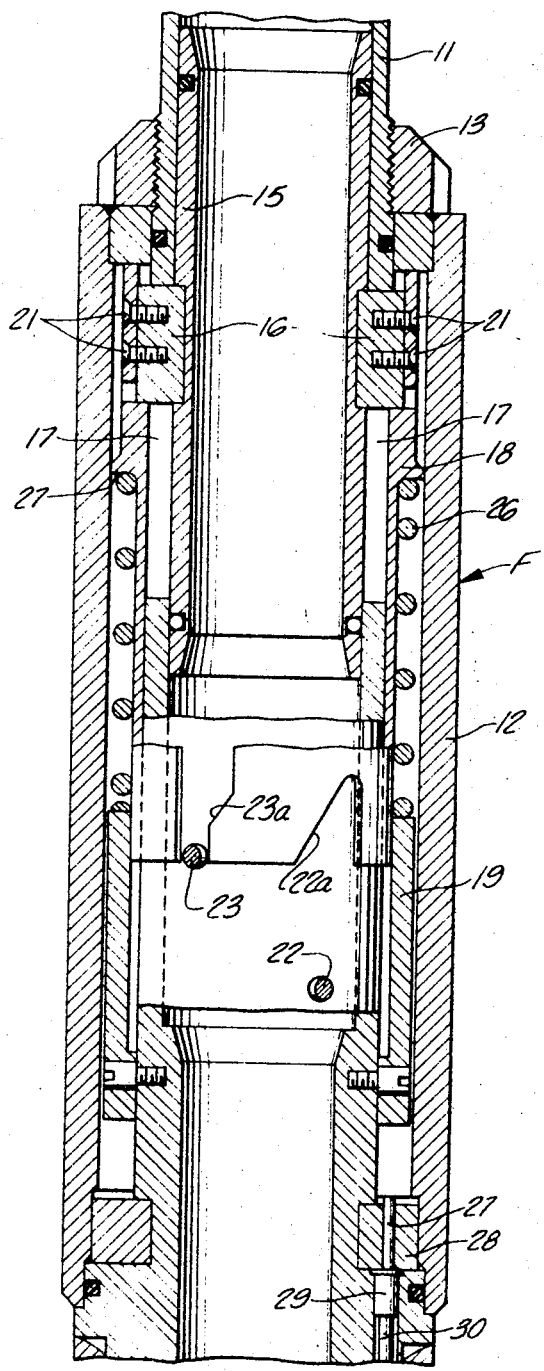
FIG. 3 is a fragmentary longitudinal sectional view through an illustrative firing mechanism useful in the apparatus of the invention.

Preferably the apparatus of this invention comprises the subsurface apparatus generally illustrated in FIG. 2 adapted to be operated in response to fluid under pressure injected through the surface apparatus generally illustrated in FIG. 1.

Referring first to the subsurface apparatus, it comprises generally a firing head assembly generally denoted at F, a fluid cross-over assembly or outlet assembly generally denoted at X, and a propellant container generally denoted at P, all united adjacent the lower end of a string of pipe generally denoted at S on which the subsurface apparatus is run into a well bore generally denoted at W, the well bore containing casing C, which herein is illustrated as extending to an uncased region of the well bore into which treating fluid is to be injected. It will be appreciated, however, that the invention has application in the treatment of earth formations through which the casing extends and wherein it is desired to treat the formation through an opening or openings in the casing affording access to the formation to be treated, as is well known in the art.

The firing mechanism F may be of any desired type which will be actuated by a member moving downwardly through the pipe string S; for example, this firing mechanism may be of the type disclosed in the prior application of Mathew B. Riordan, Jr. referred to above or as disclosed in my prior patent No. 3,001,584 or Patent No. 2,970,647.

Shown in the surface equipment of FIG. 1 is a member adapted to actuate the firing mechanism, such member being constituted by a rubber plug 1 disposed in a typical lubricator assembly at the well head and temporarily held in position by retainer means 2 such as, for example, the retainer means of my prior Patent No. 2,984,301.

The surface pumping means in FIG. 1 is adapted to pump fluid through a valved conduit 3 into the pipe string S, but upon closing the valve in conduit 3 fluid may be pumped through a bypass conduit 4 and the retainer 2 released so that the plug 1 will be pumped down the pipe string S responsive to and during the operation of the surface pumping means so as to cause operation of the firing mechanism F. Alternatively, the firing mechanism may be actuated by means of a device such as a go-devil which is adapted to gravitate through fluid in the pipe string S, as is apparent to those skilled in the art.

More particularly, the subsurface apparatus is connected in the tubing string by means of a coupling 10 connected to the upper extremity of the body 11 of the firing mechanism F. This body is encompassed by a case 12 abutting at its upper end with a nut 13 threaded to the body 11, and abutting at its lower end with a nut 14 threaded to the cross-over assembly and having an inner flange for holding the firing head body 11 in abutting contact with the upper extremity of the cross-over housing. Slidably and sealingly engaged within the firing head body 11 is a tubular actuator sleeve 15 carrying lugs 16 which project laterally through elongated slots 17 in the body 11. Firing cam means in the form of a sleeve 18 slidable along the exterior of the body 11 and within the case 12 are provided for effecting the cocking and release of a hammer 19, this hammer being tubular in form and disposed about the body 11. At its upper extremity, the firing cam is secured as by fasteners 21 to the lugs 16 so as to be moved longitudinally with the actuator sleeve 15. Internally of and integral with the hammer 19 is a pair of cam follower pins 22 and 23 respectively engageable with cam surfaces 22a and 23a formed on the lower extremity of the firing cam 18.

As seen in FIGS. 4, 5 and 6, the hammer 19 is provided with an L-shaped slot 24 in which rides a pin 25 projecting from the body 11. A coiled compression spring 26 engaged at one end with a shoulder 27 on the firing cam 18 and at the other end with the hammer 19 is employed to bias the hammer downwardly. As seen in FIG. 4, the hammer 19 is retained in an upper or cocked position by pin 25, and the firing cam 18 may move downwardly to compress the spring 26 until pin 22 engages cam surface 22a to cause rotation of the hammer 19 from the position shown in FIG. 5 to the position shown in FIG. 6, at which position the hammer is released and will be forced downwardly by the spring 26. It will also be observed that upward movement of the firing cam 18 from the position shown in FIG. 6 to the position shown in FIG. 4 will cause cam surface 23a to engage pin 23 to move the hammer rotatively back to the cocked position of FIG. 4.

The foregoing will suffice for a general understanding of the firing mechanism which is described in greater detail in the aforementioned application of Mathew B. Riordan, Jr. and, as pointed out above, the firing mechanism may take the form of either of those disclosed and claimed in my aforementioned patents.

Suffice it to say with respect to the firing mechanism that its purpose is to fire a number of firing pins 27 supported in a breech block 28, the latter being of annular form and engaging a number of blank cartridges 29 which are adapted, upon firing, to ignite a firing strip or detonator 30 which, as will now be described, extends downwardly through the crossover assembly X. Referring to FIG. 7, it will be noted that the crossover assembly includes the aforementioned housing designated 31 which is of tubular form and is suspended by the nut 14 from the firing head housing 11. Within the housing 31 is an inner body 32 closed at its lower end at 33 and longitudinally slotted at 32a to accommodate the firing or detonator strip or strips 30, as the case may be, there preferably being a plurality of detonator strips as best seen in FIG. 9. Also, with reference to FIG. 9, it will be noted that the cross-over housing and body are longitudinally slotted at 34 in a plurality of angularly displaced locations so that fluid flowing downwardly through the firing head will pass through the slots 34 to the exterior of the subsurface apparatus and, consequently, into the well bore.

Within the lower end of the cross-over assembly housing 31 beneath the lower end 33 of the inner body is a primer charge 35 of solid propellant, the detonator strips 30 extending into this charge to ignite the same.

The primer charge 35 is confined within the primer charge chamber by a ported closure 36 threaded into a fitting 37 at the lower end of the housing 31. This closure is provided with a central passage or port 38 extending therethrough and leading into the main propellant chamber of the subsurface apparatus.

The propellant chamber P comprises a case 39 having at its upper extremity a fitting 40 which is threadedly connected to the closure 36. Preferably, communication between the primer chamber and the main propellant chamber is blocked by a disc 41 pressed into the closure 36 at the lower end of the port 38.

Within the propellant chamber case 39 is a secondary charge of solid propellant material from which will be generated a large volume of gas whereby to enhance the injection of treating fluid into the formation.

As mentioned above, an object of the invention is to make use of reclaimed propellant, thereby effecting substantial economy in the instant well treating operation. Accordingly, the case 39 of the propellant chamber is filled with propellant material of granular form. Such propellant material may be obtained as a by-product of the removal of such propellant from rocket motors in which the propellant is cast as a unit. I have found that the removal of rocket propellant from rocket motors by hydraulic cutting means results in the recovery of large quantities of the propellant material of particulate or granular form, the particles being soaked with water and extremely difficult to ignite. Typical hydraulic cutting means for the removal of rocket propellant from rocket motors, and the procedure for removing the rocket propellant, are described in my copending United States patent application, Serial No. 209,997, filed July 16, 1962. The disposition of such waste propellant has heretofore posed a problem but, in accordance with the present invention, such water soaked propellant particles are dried to the extent that they are easily ignitable and may then be employed in the present apparatus by filling the case 39 with such particles.

Preferably, the reclaimed propellant particles may be employed in the propellant case in graded particle sizes by providing an annular body 42 of large particles 43 surrounding an inner core 44 of smaller particles 45. Inasmuch as the smaller particles constituting the core 44 may be more densely compacted than the larger particles constituting the annular body 42, the central core will have a more rapid burning rate so that a burning front will progress more rapidly along the axis of the tool propellant body, the front progressing radially from the core whereby to cause more uniform burning of the entire propellant charge within the case 39.

Figure 10:
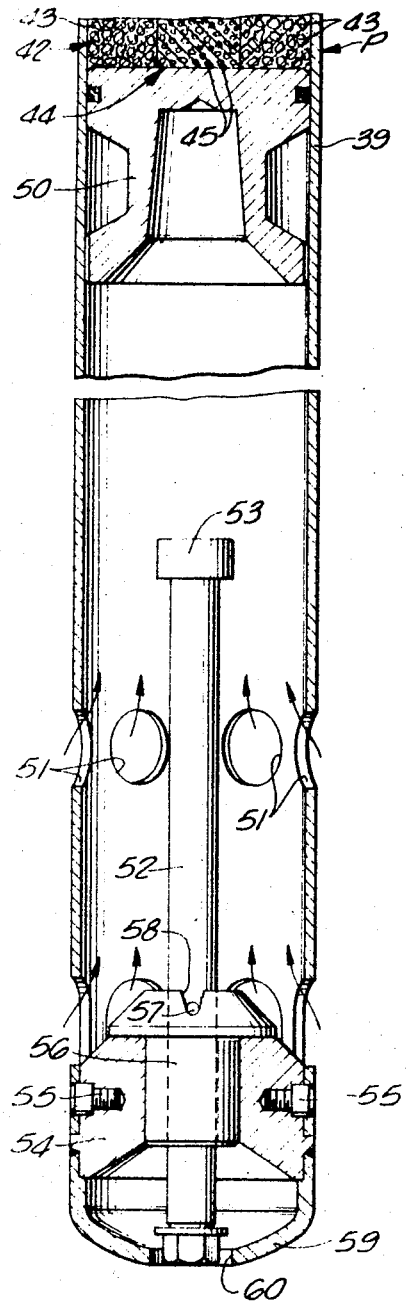
FIG. 10 is a fragmentary longitudinal sectional view corresponding to FIG. 8, but showing the apparatus being run into a well.

Means are provided for compacting the particular propellant material within the propellant chamber. In the illustrative embodiment, this means comprises a floating piston 50 slidably and sealingly engaged within the propellant case 39. The lower end of the propellant case is provided with a plurality of longitudinally and circularly spaced ports 51, whereby the fluid in the well bore is admitted to the lower end of the case 39 as indicated by the arrows in FIG. 10 and hydrostatic pressure will act upon the floating piston 50 to cause upward movement thereof in the case 39 from its lower-most position as seen in FIG. 8 to the position shown in FIG. 10, the upward displacement of the piston and the consequent compaction of the propellant material being proportional to the height of the column of fluid in the well or to the dynamic pressure of fluid injected into the well by the surface pumping means.

Upon firing of the propellant the release of the high pressure gas from the case 39 is effected through the lower end thereof and, hence, there is provided displaceable stop means for limiting downward movement of the floating piston 50, this stop means being insertable into the lower end of the case 39 following the placement of the propellant material therein and the insertion of the piston into the case. This stop means includes an elongated rod 52 having a head 53 engageable with the piston 50 to hold the latter in a position longitudinally inward of the lower-most ports 51 as shown in FIG. 8 so as to prevent the egress of the propellant particles but yet allowing the free entry of fluid from the well bore into the case beneath the piston as indicated by the arrows in FIG. 10. The rod 52 is held in position with the piston by means of a support body 54 secured in the case 39 as by means of fasteners 55 and carrying a bushing 56 having a central opening therethrough through which the rod 52 extends. Means are employed for releasably supporting the rod 52 in the position at which it holds the piston 50 inwardly beyond the upper-most ports 51, this means preferably being in the form of a frangible pin 57 projected through the rod 52 and engaging in a recess 58 at the upper end of the bushing 56. At the lower end of the support body 54 is a dome-like nose 59 having a central opening 60 to permit the downward passage of the rod 52 upon ignition of the propellant charge.

One mode of usage of the apparatus thus far described will now be explained. The subsurface equipment comprising the firing mechanism F, the crossover assembly X, and the propellant container P is run into the well on the pipe string S in the customary manner, the pipe string S including above this subsurface equipment a conventional well packer or seal 65. The packer 65 isolates the subsurface earth formation undergoing treatment from the well bore W above the packer so as to enable pressurization of treating fluid within the well bore below the packer, thereby to cause the treating fluid to penetrate the potentially productive earth formation which, as illustrated in FIG. 2, may be traversed by the well bore and may be uncased.

Figure 11:
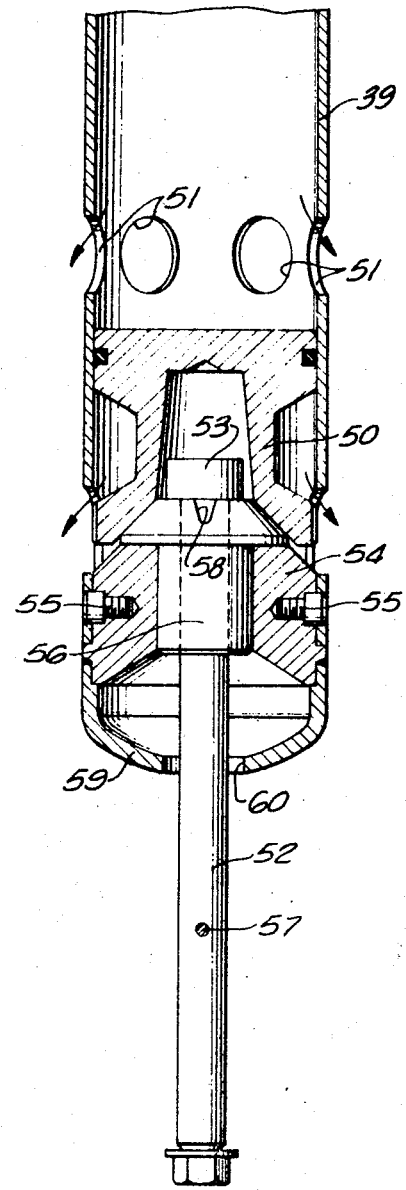
FIG. 11 is a view showing the apparatus of FIG. 10 following the firing of the propellant to inject fluid into the well.

Under pressure supplied by the surface pumping means, the treating fluid such as fracturing fluid, for example, is pumped down the pipe string S through the firing mechanism F and into the well bore W below the packer 65 through the passages 34 provided in the crossover assembly X. When the fracturing fluid is injected into the well bore beneath the packer 65 at such a rate as to develop pressures creating forces which exceed the tensile or compressive strength of the formation, as the case may be, the formation will be fractured by the hydraulic pressure wedges intruding into the formation. However, actual fracturing of the formation is oftentimes difficult, if not impossible, to accomplish due to various known limitations on the availability of fluid at the zone to be treated at sufficient pressure to cause fracturing. The available pressure at the zone to be treated is substantially enhanced in accordance with the present invention by the release of the member 1 from the lubricator shown in FIG. 1, the member traveling with the fluid downwardly through the pipe string S into contact with the actuator sleeve 15 of the firing mechanism F. The continued pumping of fluid will cause the actuator sleeve to move downwardly compressing the spring 26 as the firing cam 18 moves correspondingly downward. Such downward movement of the firing cam will, as shown in FIGS. 5 and 6, cause rotation of the hammer 19 to a position at which pin 25 is free to move lonigutudinally relative to the elongated portion 24 of the L-slot in the hammer 19, resulting in the forceful downward movement of the hammer under the influence of the spring into firing contact with firing pins 27 which will fire blank cartridges 29 which will, in turn, ignite the ignitor strips 30 to cause ignition of the primary propellant charge 35. Combustion of the charge 35 will cause the disc 41 to be blown from the lower end of the port 38 in the closure 36 and the propellant core 44 will be ignited burning rapidly longitudinally of the composite propellant charge in the case 39 and thereby igniting the annular body 42 of propellant material to assure complete combustion of the composite charge. The gases generated by the burning of the propellant will act upon the float piston 50 moving downwardly into contact with the stop rod 52 as illustrated in FIG. 8, thereby causing shearing of the frangible pin 57 so as to allow downward movement of the rod 52 as shown in FIG. 11, the gas thereby being liberated into the well bore through the upper ports 51 in the lower extremity of the case 39 as indicated by the arrows in FIG. 11, the gas so liberated will supplement the pressure of the fluid acting on the formation to be treated in proportion to the volume of gas produced by the propellant material thereby causing a surge in the effective hydraulic pressure tending to force the treating fluid into the formation. It will be understood that the volumetric displacement of the liberated gas will be proportional to the bottom hole pressure.

If the fluid loss characteristics of the formation undergoing treatment should be such that a column of fluid will not bleed off into the formation and, consequently, it is unnecessary to continue the pumping of fluid to maintain pressure upon the formation until the subsurface apparatus is actuated to burn the propellant charge, then in lieu of the pump down actuator member 1 above described, a go-devil or other suitable device may be dropped through the pipe string S to cause actuation of the firing mechanism. The effective pressure acting upon the formation under these circumstances will be the hydrostatic pressure of the column supplemented by the pressure supplied by the gas generated by the burning of the propellant.

Figure 12:
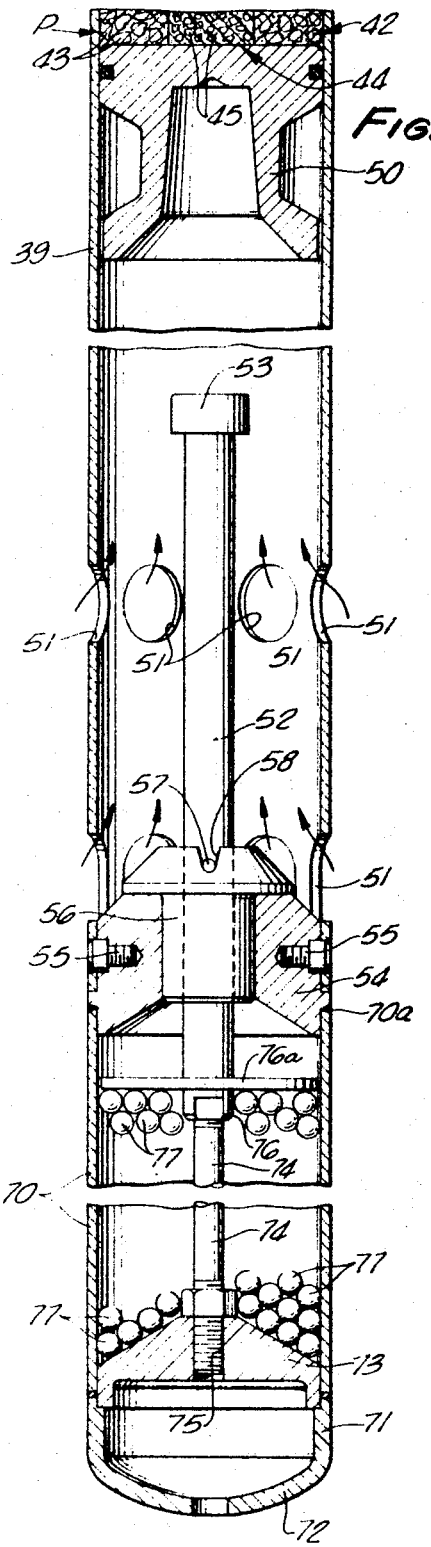
FIG. 12 is a view corresponding to FIG. 10, but showing an embodiment of the invention in which a container for propping agent is embodied in the apparatus.

As mentioned above, it is common to employ propping agents to hold open fractures created by the injection of fluid into the formation, such propping agents characteristically comprising sand, ground walnut shells, aluminum pellets or the like, of a mesh size on the order of 10 to 20 mesh. It would be desirable, however, to introduce into the fractures initially opened a much larger diameter propping agent, say on the order of ½" to ¾" particle diameter, inasmuch as the fractures are believed to initially open wide and to later partially close. However, the introduction of large propping agents into the fluid during the operation of surface pumps poses a problem inasmuch as the propping agents cannot be entrained in the treating fluid in advance of the pump intake as is the practice with the small grained propping agents. Accordingly, pursuant to one of the features of the present invention, there is illustrated in FIG. 12 means for containing a quantity of propping agent, which means is operable to release the propping agent upon firing of the propellant charge, whereby there is effectively provided a facility for introducing into the treating fluid, just ahead of its entry into the formation, comparatively large propping agents as mentioned above. Referring to FIG. 12, it will be noted that there is provided beneath the stop rod support 54, an elongated housing or container 70 which may be welded or otherwise secured as at 70a to the support 54. At the lower extremity of the container 70 is a closure 71 comprising a dome-like nose 72 and an inner disc 73, this disc is connected to the lower extremity of the stop rod 52 by means of a connecting rod 74 threaded into the disc at 75 and into the stop rod at its lower extremity, being held in place by a jam nut at 76. Means is preferably provided for positively discharging propping elements from the container 70, such means comprising for example a disc 76a mounted on rod 74 between the nut 76 and the lower extremity of stop rod 52 and extending outwardly so as to span the container in the manner of a follower. The container and the connecting rod may be of any suitable length so as to contain a desired quantity of propping elements 77 which may be in the form of, for example, nylon balls having a diameter on the order of ½" to 1".

Figure 13:
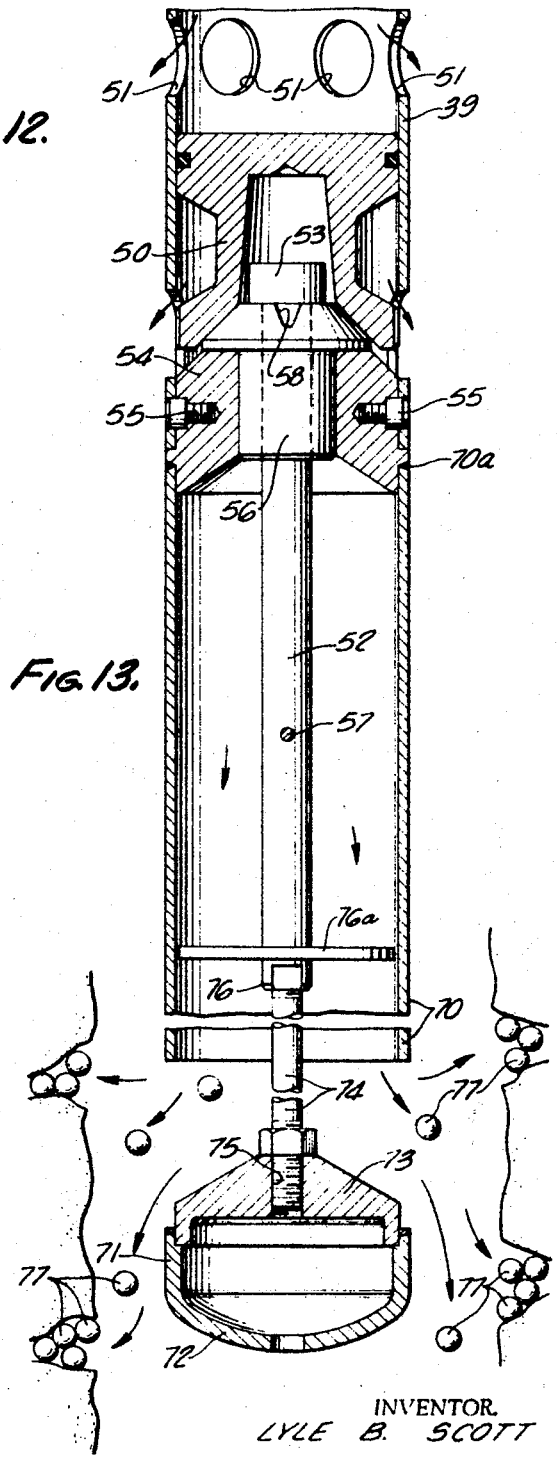
FIG. 13 is a view showing the apparatus of FIG. 12 following the firing of the propellant and the release of the propping agent.

Upon burning of the propellant as described above, the floating piston 50, normally held upward by the head of fluid acting against it through the ports 51 as indicated by the arrows in FIG. 12, is forced downward, and as shown in FIG. 13 engages the stop rod 52 causing the displacement of the closure 71 from the lower end of the container 70 allowing discharge of the propping elements therefrom into the treating fluid flowing downwardly about the container as indicated by the arrows into the formation which is shown in FIG. 13 to have fractures formed therein into which the propping elements are carried by the treating fluid.

Accordingly, it will now be observed that the invention contemplates as an aspect thereof, the placement of a quantity of large size propping agent within the well bore so as to be entrained in the treating fluid and carried to the formation being treated.

While the specific details of the invention have been herein shown and described, changes and alterations may be resorted to without departing from the spirit of the invention as defined in the appended claims.

I claim:

1. Fluid injection apparatus insertable in a well bore and operable to generate a volume of gas in the well bore comprising: an elongated assembly having a central flow passage for injection of said fluid, an outlet assembly communicating said central flow passage with said well bore, a propellant container below said outlet assembly comprising an elongated tubular case filled with solid monopropellant, firing means, ignitor means operable by said firing means for igniting said propellant, and means at the lower end of said elongated assembly for liberating gas generated by said propellant upon ignition.

2. Apparatus as defined in claim 1, wherein said solid monopropellant comprises a body of particulate propellant material.

3. Apparatus as defined in claim 1, wherein said solid monopropellant comprises a body of particulate propellant material, and means for compacting said particulate propellant material in said case responsive to the fluid head in said well bore.

4. Apparatus as defined in claim 1, wherein said solid monopropellant comprises a body of particulate propellant material, and a piston slidable in said case and exposed to the fluid in said well bore to compact said particulate propellant material.

5. Apparatus as defined in claim 1, wherein said solid monopropellant comprises an outer body of particulate propellant material and a central core of propellant material having greater density than said outer body and thereby having a more rapid burning rate.

6. Fluid injection apparatus insertable in a well bore and operable to generate a volume of gas in the well bore comprising: an elongated assembly including outlet means having a central flow passage and also having lateral outlets for the passage of fluid therefrom, means for connecting said outlet means to a pipe string, and a tubular propellant container connected at one end to said outlet means and filled with a gas generating material, means responsive to gas generated by said material for liberating from said container at its other end gas generated by said material upon ignition, and means in said assembly for initiating the generation of gas by said material.

7. Fluid injection apparatus insertable in a well bore and operable to generate a volume of gas in the well bore comprising: an elongated assembly including an outlet assembly means having a central flow passage and also having a lateral outlet for the passage of fluid therefrom, means for connecting said outlet assembly to a pipe string, and a tubular propellant container connected at one end to said outlet assembly, said container having a primary chamber containing a first charge of ignitable monopropellant material and a secondary chamber containing a second charge of ignitable monopropellant material, means providing a passageway leading between said chambers, a closure for said passageway and removable from said passageway by gases generated by said first charge upon igniting, firing means associated with said primary chamber for igniting said first charge, said secondary charge being ignited through said passageway by said first charge, and means for releasing from said secondary chamber the gas generated by said second charge upon its ignition.

8. Apparatus as defined in claim 7, wherein said second charge comprises a core of fast burning monopropellant exposed at said passageway and surrounded by a body of slower burning monopropellant.

9. Apparatus as defined in claim 7, wherein said second charge is composed of particulate monopropellant material.

10. Apparatus as defined in claim 7, wherein said second charge is composed of particulate monopropellant material and including means for compacting said monopropellant material responsive to the pressure of fluid in said well bore.

11. The method of fracturing earth formation into which or through which a well has been drilled comprising: injecting fluid under pressure into said well to force the same into said formation to fracture the same, liberating in said treating fluid adjacent said formation a large volume of gas to force the treating fluid into said formation, and responsive to the liberation of said gas releasing in said treating fluid adjacent said formation a quantity of propping elements adapted to be carried by said treating fluid into fractures formed in said formation.

12. Apparatus for use in the hydraulic fracturing of earth formation into which or through which a well has been drilled comprising: an elongated receptacle, a quantity of propping elements in said receptacle, means releasably retaining said propping elements in said receptacle, means for connecting said receptacle to a pipe string through which fracturing fluid is pumped into said well, and means operable responsive to the passage of fracturing fluid through the pipe string for releasing said retainer means to allow said propping elements to be entrained in the fluid flowing to said formation.

13. Apparatus as defined in claim 12, wherein said means responsive to the passage of fluid through said pipe string includes means for generating a volume of gas to assist in the forcing of said fluid into said formation.

14. Apparatus for use in the hydraulic fracturing of earth formation into which or through which a well has been drilled comprising: an elongated assemblage connectible to a pipe string through which fracturing fluid is injected into said well, said assemblage including a central passage communicating with said pipe string and a lateral outlet passage for said fracturing fluid, a tubular propellant container beneath said outlet assembly, said container having therein a material capable of generating a large volume of gas upon ignition, firing means in said assemblage for causing ignition of said material, outlet means at the lower end of said container for the passage of said gas into said well, a free piston in said container between said outlet means and said material, displaceable stop means for limiting downward movement of said piston past said outlet means, and means retaining said stop means in place and releasable upon the generation of gas by said material and the application of said gas pressure to said piston to allow said piston to move downwardly below said outlet means.

15. Apparatus as defined in claim 14, including a container below said outlet means, a quantity of propping elements in said container, a closure at the lower extremity of said container and means connecting said closure to said stop means for displacing said closure upon release of said stop means.

16. Apparatus for use in the hydraulic fracturing of earth formation into which or through which a well has been drilled comprising: an elongated receptacle, a quantity of propping elements in said receptacle, means releasably retaining said propping elements in said receptacle, means for connecting said receptacle to a pipe string through which fluid is pumped into said well, and means for releasing said retainer means to allow said propping elements to be entrained in the fluid flowing to said formation.

17. Apparatus for use in the hydraulic fracturing of earth formation into which or through which a well has been drilled comprising: an elongated receptacle, a quantity of propping elements in said receptacle, means releasably retaining said propping elements in said receptacle, means for connecting said receptacle to a pipe string through which fluid is pumped into said well, and means for releasing said retainer means to allow said propping elements to be entrained in the fluid flowing to said formation, and discharge follower means in said receptacle for effecting the positive displacement of said propping elements from said receptacle.

References Cited by the Examiner

UNITED STATES PATENTS

| | | | |
|---|---|---|---|
| 2,766,828 | 10/1956 | Rachford | 166—42.1 |
| 3,090,436 | 4/1963 | Briggs | 166—63 |
| 3,101,115 | 8/1963 | Riordan | 166—42.1 |
| 3,170,517 | 2/1965 | Graham et al. | 166—42.1 |
| 3,174,545 | 3/1965 | Mohaupt | 166—42.1 |

ERNEST R. PURSER, *Primary Examiner.*

CHARLES E. O'CONNELL, *Examiner.*

J. A. LEPPINK, *Assistant Examiner.*